(12) United States Patent
Busch

(10) Patent No.: US 8,348,578 B2
(45) Date of Patent: Jan. 8, 2013

(54) ENGAGEMENT UNIT FOR ATTACHING AND FOR ENGAGING A THREADED BOLT

(75) Inventor: Martin Busch, Efringen-Kirchen (DE)

(73) Assignee: A. Raymond Et Cie, Grenoble (FR)

( * ) Notice: Subject to any disclaimer, the term of this patent is extended or adjusted under 35 U.S.C. 154(b) by 89 days.

(21) Appl. No.: 12/812,179

(22) PCT Filed: Dec. 11, 2008

(86) PCT No.: PCT/EP2008/010507
§ 371 (c)(1),
(2), (4) Date: Jul. 8, 2010

(87) PCT Pub. No.: WO2009/086877
PCT Pub. Date: Jul. 16, 2009

(65) Prior Publication Data
US 2010/0284763 A1 Nov. 11, 2010

(30) Foreign Application Priority Data
Jan. 10, 2008 (DE) .................... 10 2008 003 884

(51) Int. Cl.
*F16B 37/08* (2006.01)
(52) U.S. Cl. ....................... 411/433; 411/437
(58) Field of Classification Search ............... 411/433, 411/437, 266, 267, 270, 278, 188
See application file for complete search history.

(56) References Cited

U.S. PATENT DOCUMENTS

| 1,956,745 | A | * | 5/1934 | Payne | 411/186 |
| 4,728,236 | A | | 3/1988 | Kraus | |
| 4,954,032 | A | * | 9/1990 | Morales | 411/289 |
| 5,027,671 | A | * | 7/1991 | Erikson et al. | 74/441 |
| 5,651,632 | A | * | 7/1997 | Gordon | 403/319 |
| 5,902,085 | A | * | 5/1999 | Yuta | 411/433 |

(Continued)

FOREIGN PATENT DOCUMENTS

DE 2723614 A1 12/1977

(Continued)

OTHER PUBLICATIONS

Search Report from the parent International Application No. PCT/EP2008/010507 published as WO2009/086877A1 on Jul. 16, 2009.

*Primary Examiner* — Roberta Delisle
(74) *Attorney, Agent, or Firm* — Faegre Baker Daniels

(57) ABSTRACT

An engagement unit for insertion on and engagement with a threaded bolt (33) is provided with an inner part (1) and with an outer part (2) that can be slid onto the inner part (1). The inner part (1) and the outer part (2) are configured with torque receiving means (8, 9, 23, 24) for transmitting a torque applied to the outer part (2) to the inner part (1). After the inner part (1) has been slid onto a threaded bolt (33) in a pre-assembly arrangement in which latching means configured on spring arms of the inner part (1) and cooperating with the threaded bolt (33) are able to slide along the threaded bolt (33), the engagement unit according to the invention can thus be inserted onto the threaded bolt (33) and, once the outer part (2) has been slid onto the inner part (1), can be tightened in the manner of a screw.

6 Claims, 4 Drawing Sheets

U.S. PATENT DOCUMENTS

| | | | |
|---|---|---|---|
| 6,179,539 B1 * | 1/2001 | Benoit et al. | 411/433 |
| 6,974,291 B2 * | 12/2005 | Li | 411/437 |
| 7,179,038 B2 | 2/2007 | Reindl | |
| 2003/0007846 A1 * | 1/2003 | Sbongk | 411/433 |
| 2005/0135901 A1 * | 6/2005 | Reindl | 411/433 |

FOREIGN PATENT DOCUMENTS

| | | |
|---|---|---|
| DE | 3525865 C1 | 8/1986 |
| EP | 1538350A1 A1 | 6/2005 |
| GB | 1536998 A | 12/1978 |

\* cited by examiner

ENGAGEMENT UNIT FOR ATTACHING AND FOR ENGAGING A THREADED BOLT

CROSS-REFERENCE TO RELATED APPLICATION

This application is a U.S. National Phase Patent Application based on International Application Serial No. PCT/EP2008/010507, filed Dec. 11, 2008, the disclosure of which is hereby explicitly incorporated by reference herein.

BACKGROUND OF THE INVENTION

1. Field of the Invention

The invention is directed to an engagement unit for insertion onto and engagement with a threaded bolt.

2. Description of the Related Art

One known engagement unit is disclosed in DE 35 25 865 C1. The prior engagement unit is equipped with a number of spring arms that are configured with latching means for engagement with a threaded bolt. The engagement unit can thus be slid onto a threaded bolt in a simple manner.

SUMMARY OF THE INVENTION

The present invention provides an engagement unit that can be slid onto a threaded bolt with a relatively low insertion force and, once the sliding-on operation has been completed, can be subjected to a relatively high torque in order to tighten it the rest of the way.

By virtue of the fact that the engagement unit according to the invention has an inner part and an outer part that can be slid onto said inner part, which are so adapted to each other that in an arrangement in which the outer part is slid onto the inner part, the spring arms configured on the inner part are blocked radially outwardly against deflection and a relatively high torque exerted on the outer part is reliably transmitted to the inner part, the inner part, in a first step, can be slid onto a threaded bolt with a relatively low insertion force, and after the outer part has been slid onto the inner part, the torque is transmitted by the now immobilized spring arms to the inner part in the manner of a screw, in order to tighten the engagement unit all the way.

In one form thereof, the present invention provides an engagement unit for insertion onto and engagement with a threaded bolt, including spring arms configured with latching means for engagement with a threaded bolt, characterized in that an inner part and an outer part that can be slid onto the inner part are present, wherein the spring arms are configured on the inner part and, in a final assembly arrangement in which the outer part is slid onto the inner part, are blocked radially outwardly against movement by spring arm seats of the outer part; wherein the inner part and the outer part are configured with torque receiving means which in the final assembly arrangement in which the outer part is pushed onto the inner part are in engagement with one another to effect the rotationally fixed connection of the outer part to the inner part; and wherein the outer part is configured with an application head adapted for the application of a torque-applying tool.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
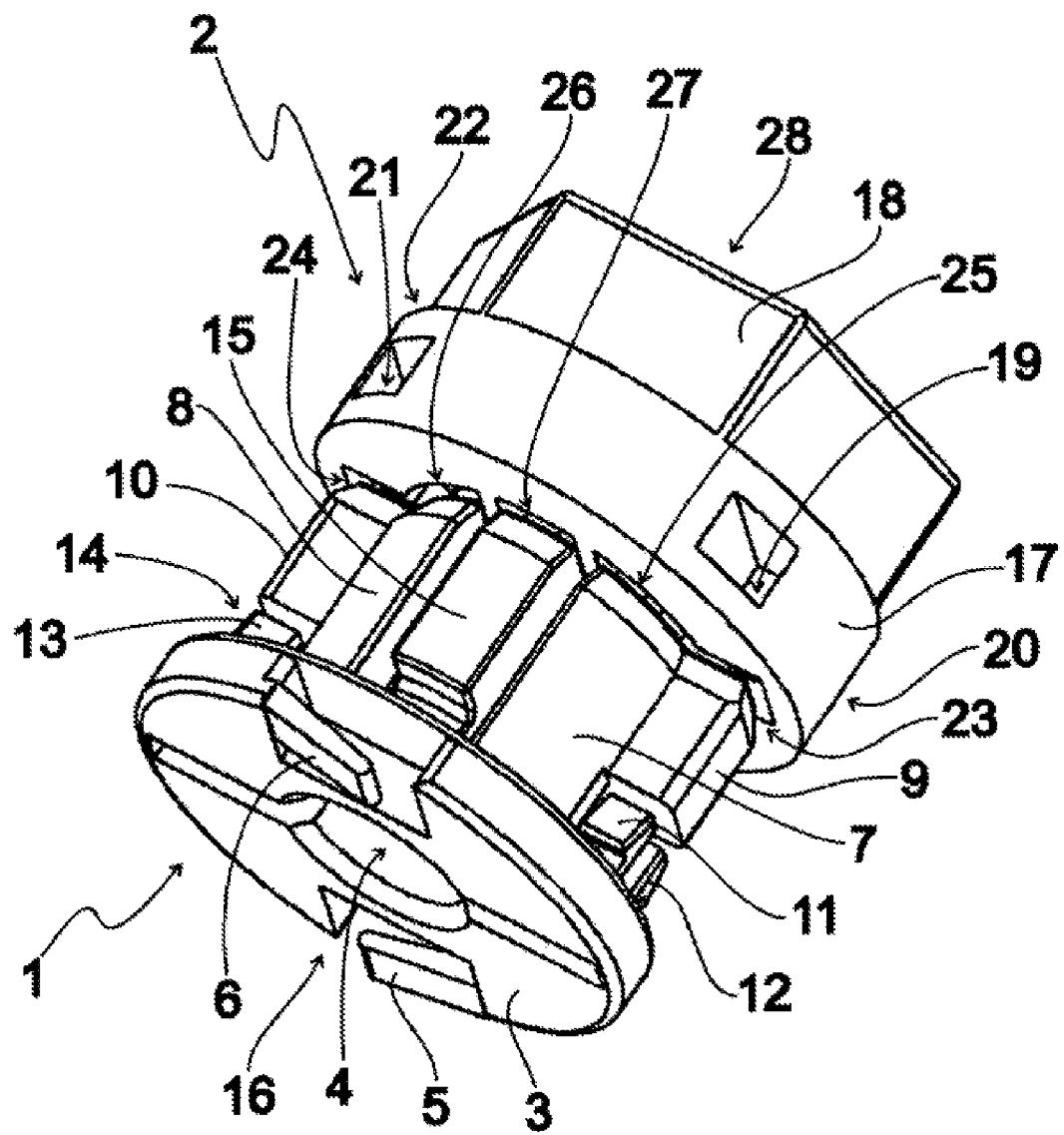
FIG. 1 is a perspective view of an exemplary embodiment of an engagement unit according to the invention, comprising an inner part and an outer part, which in a pre-assembly arrangement are spaced apart from each other in the longitudinal direction and are connected to each other.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of an engagement unit according to the invention, which is provided with an inner part 1 and an outer part 2.

The inner part 1 is fitted with a roundish, disk-like bearing plate 3, which has a centrally disposed insertion opening 4 for the insertion of a threaded bolt (not shown in FIG. 1). Bearing plate 3 is also, advantageously but not necessarily, configured with mutually diametrically oppositely disposed biasing tongues 5, 6, which extend in a circumferential direction and, in a relaxed arrangement depicted in FIG. 1, protrude in an axial direction beyond the bottom side of bearing plate 3, which is the side facing the viewer in the representation of FIG. 1.

Inner part 1 is further configured with two inner bodies 7, 8 which, taken together, have a cylindrical basic shape with a smaller diameter than bearing plate 3, and which extend away from bearing plate 3 in a direction oriented away from biasing tongues 5, 6. The outer circumference of inner bodies 7, 8 is smaller than the outer circumference of bearing plate 3.

Formed on each inner body 7, 8 are cuboid edge blocks 9, 10, which are disposed diametrically opposite each other, extend by their long sides in the longitudinal direction of inner part 1, and are spaced apart from bearing plate 3. Configured between bearing plate 3 and the end of each edge block 9, 10 facing toward bearing plate 3 is a respective pair of mutually confronting latching hooks 11, 12, 13, 14. The latching hooks 11, 12, 13, 14 face outward and protrude beyond the flat sides of edge blocks 9, 10 that are perpendicular to the circumferential direction.

In the illustrated exemplary embodiment, inner part 1 is also provided with two mutually diametrically oppositely disposed spring arms 15, 16, each of which is located between the inner bodies 7, 8, approximately midway between the edge blocks 9, 10. More than two spring arms 15, 16 can be present in exemplary embodiments that are not shown.

Outer part 2 has a disk-like, circular outer bushing 17 and, formed on said outer bushing 17, an application head 18 for torque transmission, configured, for example, as an outer hexagon for engagement with a standard tool, as depicted in FIG. 1, or with another geometry. Provided in outer bushing 17 are latching openings 19, 20, 21, 22, which are disposed opposite each other in pairs and extend in pairwise alignment through outer bushing 17, and are each configured to engage with a respective latching hook 11, 12, 13, 14.

It can also be discerned from FIG. 1 that outer part 2 is configured, on the one hand, with edge block seats 23, 24, for receiving the edge blocks 9, 10 with a exact fit in the circumferential direction; with inner body seats 25, 26, for receiving the inner bodies 7, 8; and with spring arm seats 27, 28, for receiving the spring arms 15, 16 with a exact fit in the radial direction and in the circumferential direction.

Figure 2:
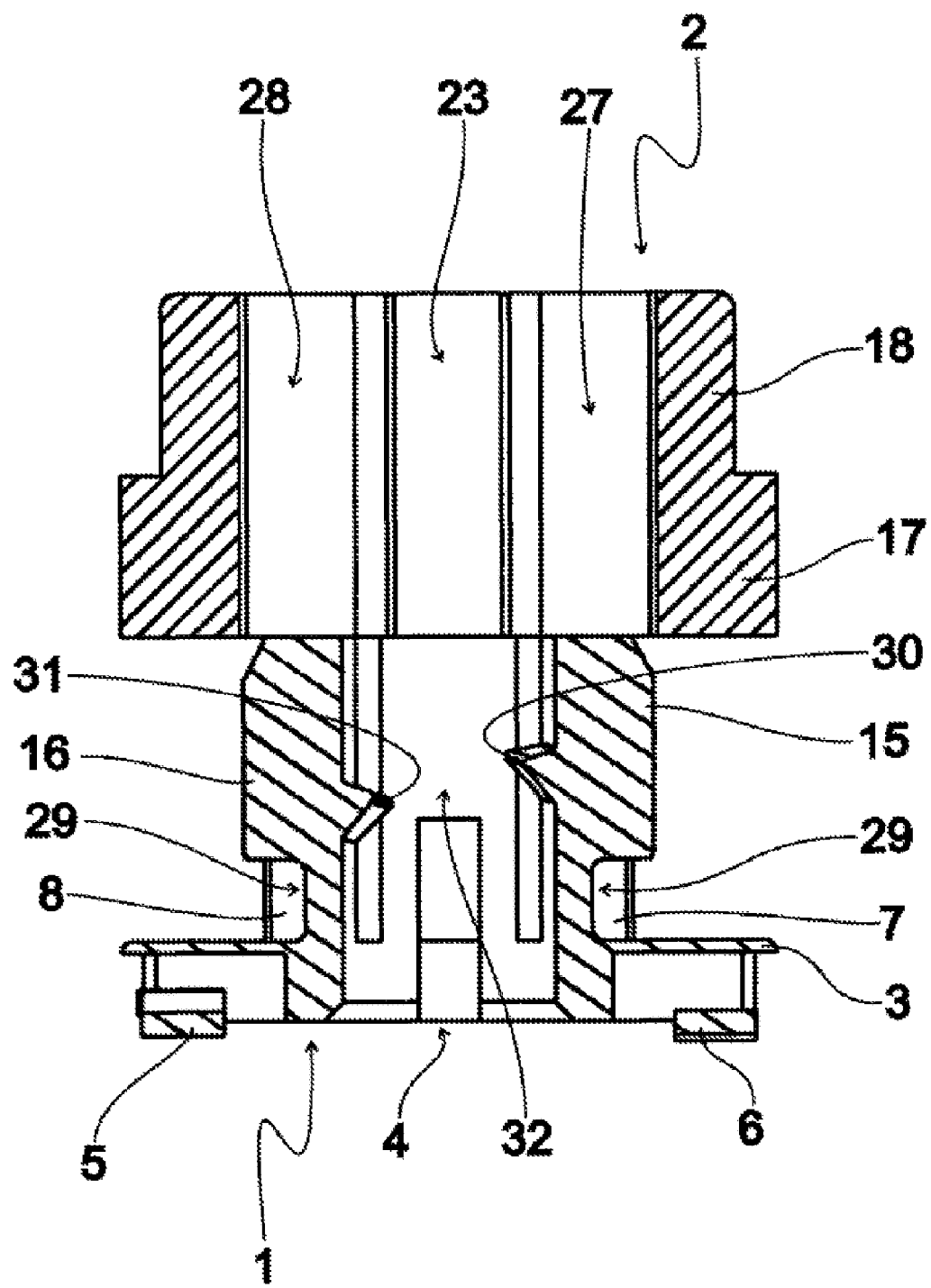
FIG. 2 is a longitudinal section of the exemplary embodiment according to FIG. 1 in the pre-assembly arrangement.

FIG. 2 is a longitudinal section of the exemplary embodiment according to FIG. 1, with the section plane passing centrally through the spring arms 15, 16. It can be seen from FIG. 2 that the spring arms 15, 16 are each configured resiliently in the radial direction by means of a spring portion 29 disposed near the bearing plate 3 and having a smaller material thickness than the other regions of the spring arms. Each spring arm 15, 16 comprises, as latching means, a latching nose 30, 31, which passes radially inward into one of the inner bodies 7, 8 and the thread bolt receiving space 32 surrounding the spring arms 15, 16. In exemplary embodiments not shown, each spring arm 15, 16 has more than one latching nose 30, 31 as latching means.

It can further be appreciated from FIG. 2 that in the pre-assembly arrangement depicted in FIGS. 1 and 2, inner part 1 and outer part 2 are spaced apart from each other in the axial direction. For example, inner part 1 and outer part 2 can be connected to each other via at least one connecting element (not shown in FIG. 1 or FIG. 2) having a relatively low resistance to shear force, or they are pre-assembled as two separate parts. In the exemplary embodiment depicted in FIGS. 1 and 2, edge block seats 23, 24, inner body seats 25, 26 and spring arm seats 27, 28 extend all the way through outer part 2 in the longitudinal direction, such that outer part 2, if applicable after the destruction of the or each connecting element, can be slid in the longitudinal direction relative to inner part 1 until outer bushing 17 butts against bearing plate 3.

Figure 3:
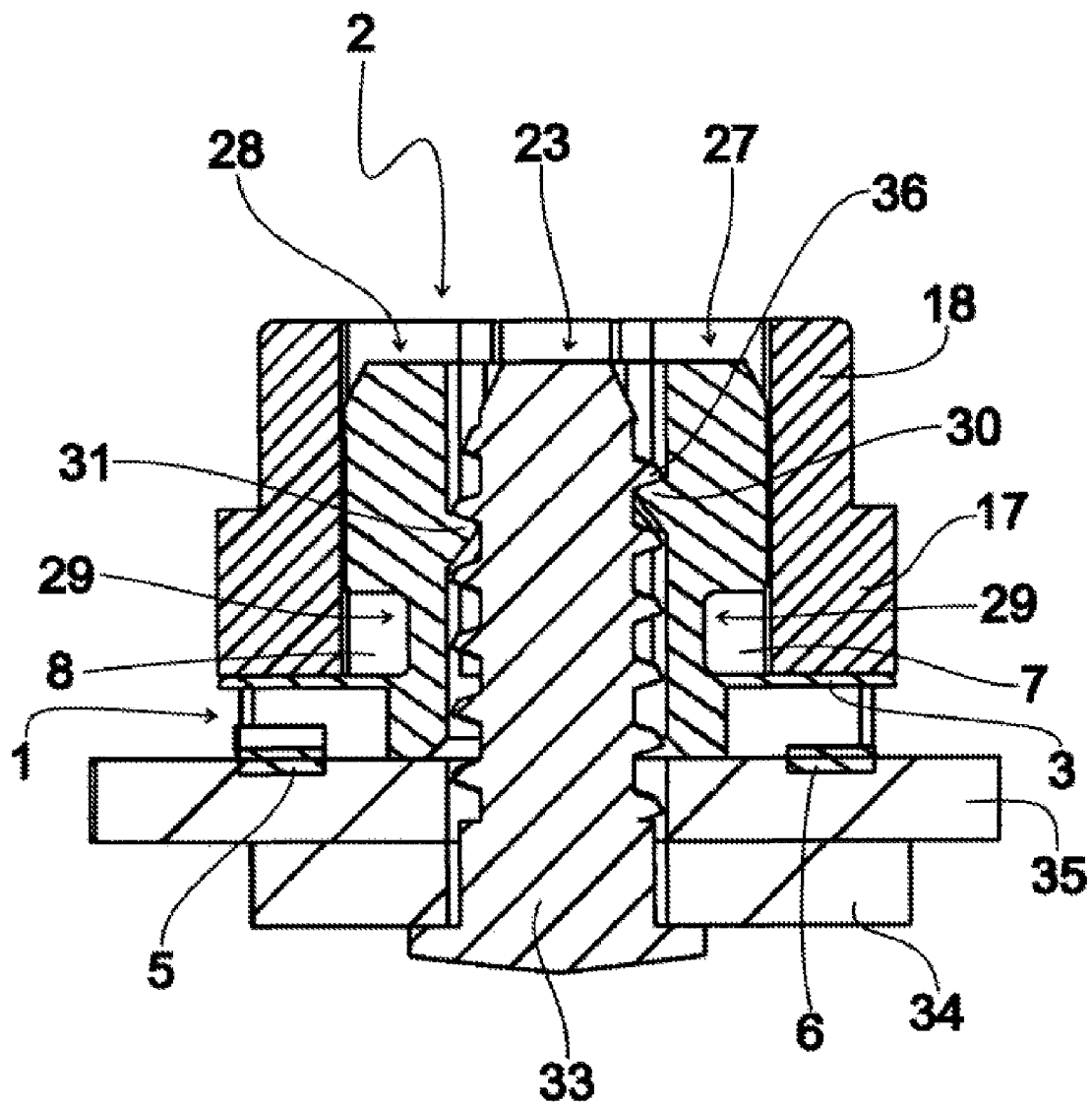
FIG. 3 is a longitudinal section of the exemplary embodiment according to FIGS. 1 and 2 in a final assembly arrangement on a threaded bolt.

FIG. 3 shows, in a longitudinal section through the plane occupied by the spring arms 15, 16, the exemplary embodiment according to FIG. 1 and FIG. 2 in a final assembly arrangement, in engagement with a threaded bolt 33 that is attached to a support part 34. It can be seen from FIG. 3 that, for example in order to attach to support part 34 an add-on part 35 through which threaded bolt 33 engages, when inner part 1 is slid on by means of a lifting/rotating tool disposed to bear against the end face of the outer bushing that projects radially beyond application head 18, when, in the pre-assembly arrangement depicted in FIGS. 1 and 2, the latching noses 30, 31 come into contact with the threaded bolt 33, passing over an external thread structure 36 configured on the threaded bolt 33, the spring arms 15, 16 deflect outward until the bearing plate 3 rests on the add-on part 35. Meanwhile, the biasing tongues 5, 6 achieve the effect of height equalization by holding inner part 1 with a given biasing force in a position in which the latching noses 30, 31 engage the external thread structure 36 from behind.

In this slid-on arrangement of the engagement unit according to the invention, outer part 2, starting from the pre-assembly arrangement depicted in FIGS. 1 and 2, is slid onto inner part 1 in the longitudinal direction until outer bushing 17 rests on bearing plate 3. In this final assembly arrangement, as can be seen in FIG. 3, the spring arms 15, 16 are each secured radially outwardly against deflection by being in contact with the radially outer wall of the respective spring arm seat 27, 28 and are also secured by being in contact with the ends of the spring arm seats 27, 28 that are disposed laterally adjacent the spring arms 15, 16 in the circumferential direction, such that a high extraction force is ensured by the reliable engagement of the latching noses 30, 31 with the external thread structure 36.

Figure 4:
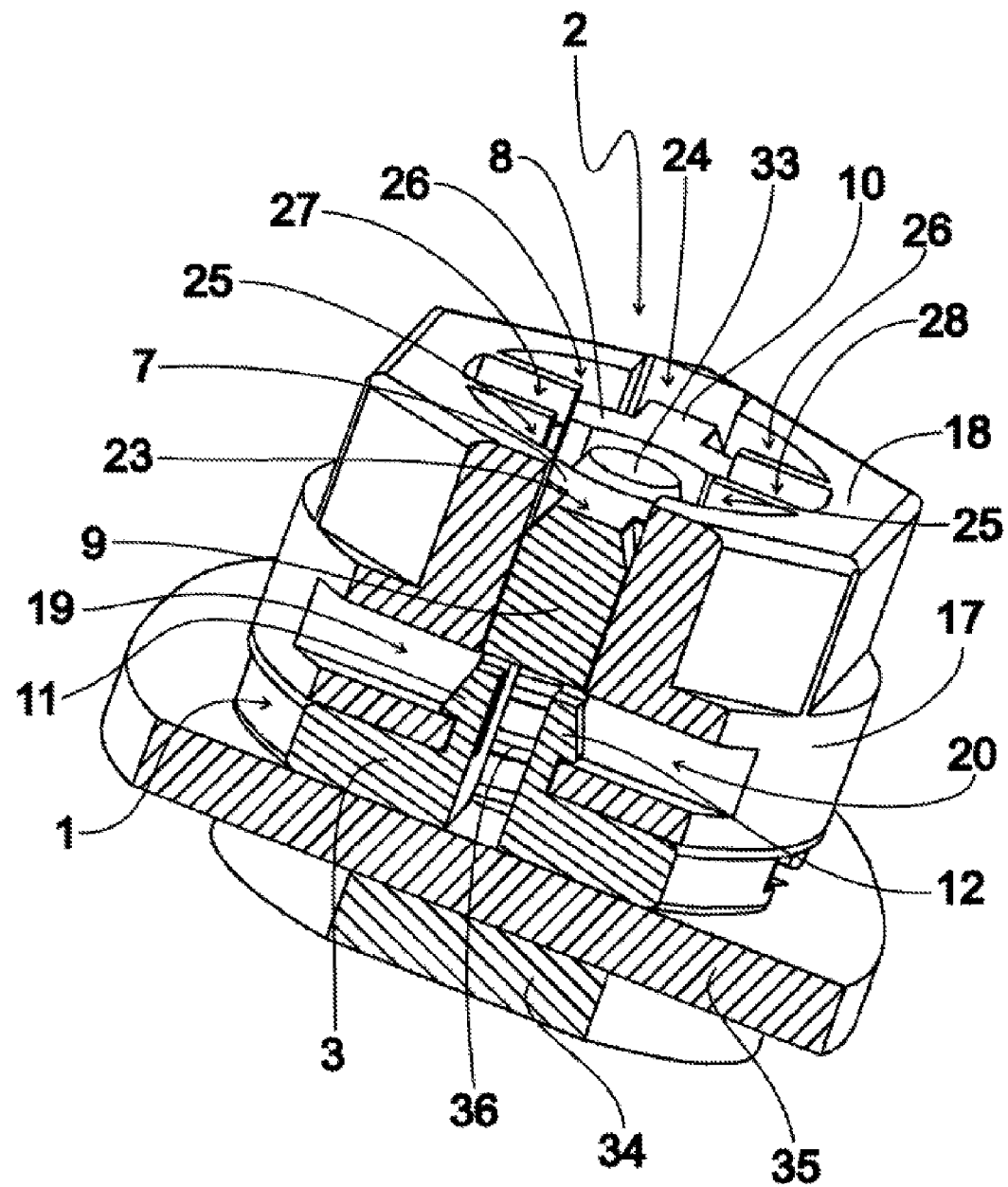
FIG. 4 is a perspective cut-away view of the exemplary embodiment according to FIGS. 1 to 3 in the final assembly arrangement according to FIG. 3.

FIG. 4 is a perspective view of the exemplary embodiment of an engagement unit according to the invention as depicted in FIGS. 1 to 3 in the final assembly arrangement shown in FIG. 3, in a longitudinal section through an edge block 9, the section plane being parallel to the radially outward-facing flat side of edge block 9 and passing through the latching hooks 11, 12 disposed between said edge block 9 and the bearing plate 3. It can be seen from FIG. 4 that the latching hooks 11, 12 are accessible from the outside, for example by means of an elongate object, so that when a suitable force is exerted on the latching hooks 11, 12, 13, 14, the engagement of the latching hooks 11, 12, 13, 14 with the latching recesses 19, 20, 21, 22 is released and outer part 2 can be withdrawn from inner part 1 again by being moved away from bearing plate 3.

It will also be discerned from FIG. 4 that the edge blocks 9, 10 bear, by their flat sides that are disposed outward in the circumferential direction, against the flat sides disposed opposite them of the edge block seats 23, 24, such that when a torque is applied to the application head 18, for example by the application of a tool, the torque is transmitted to inner part 1 via the engagement of edge blocks 9, 10 with outer part 2, and the inventive engagement unit can be tightened in a screw-like manner in order to attach the add-on part 35 to the support part 34 with a given pressure force. In addition, when a suitable torque is applied counter to the thread direction of the external thread structure 36, the engagement unit according to the invention can be unscrewed for servicing purposes in the manner of a nut, so that the add-on part 35 can be removed from the support part 34. Outer part 2 is then expediently removed from inner part 1 as described above, so that the engagement unit can be re-used in the prescribed manner.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An engagement unit for insertion onto, and engagement with, a threaded bolt, said engagement unit comprising:
   an inner part, said inner part including spring arms having latches engagable with the threaded bolt;
   an outer part, said outer part slidable onto said inner part along an insertion direction to a final assembly arrangement in which said spring arms are blocked radially outwardly against movement by spring arm seats formed on said outer part, said outer part further including an application head adapted for engagement by a torque-applying tool;
   said inner part and said outer part including mutually engaging, torque resistant structures which, in said final assembly arrangement, are in engagement with one another to prevent relative rotation between said outer part and said inner part; and
   said inner part and said outer part including a latching arrangement which, in said final assembly arrangement, fixes said outer part onto said inner part, said latching arrangement including latching hooks configured on said inner part and latching recesses configured on said outer part;

said latching hooks engaging said latching recesses in said final assembly arrangement; and said latching recesses extending through, and open externally of, said outer part, and said latching hooks accessible externally of said outer part through said latching recesses in order to release said latching hooks from said latching recesses.

2. The engagement unit of claim 1, wherein said torque resistant structures include externally protruding edge blocks configured on said inner part and edge block seats configured on said outer part, said edge block seats complementary to said edge blocks.

3. The engagement unit of claim 1, wherein said inner part includes a biasing structure acting against said insertion direction.

4. The engagement unit of claim 3, wherein said biasing structure includes biasing tongues extending from said inner part.

5. The engagement unit of claim 1, wherein said outer part includes an outer bushing in which said latching recesses are formed.

6. The engagement unit of claim 1, wherein said insertion direction is along an axial direction, and said latching recesses extend through said outer part along a radial direction perpendicular to said axial direction.

* * * * *